(12) United States Patent
Kleiner et al.

(10) Patent No.: US 10,152,232 B1
(45) Date of Patent: Dec. 11, 2018

(54) LOW-IMPACT APPLICATION-LEVEL PERFORMANCE MONITORING WITH MINIMAL AND AUTOMATICALLY UPGRADABLE INSTRUMENTATION IN A STORAGE SYSTEM

(71) Applicant: EMC Corporation, Hopkinton, MA (US)

(72) Inventors: Vladimir Kleiner, Yehud (IL); Kirill Shoikhet, Raanana (IL); Amir Miron, Rishon Letzion (IL); Anton Kucherov, Milford, MA (US); Alexandr Veprinsky, Brookline, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 90 days.

(21) Appl. No.: 15/196,674

(22) Filed: Jun. 29, 2016

(51) Int. Cl.
    *G06F 3/06* (2006.01)

(52) U.S. Cl.
    CPC ............ *G06F 3/0607* (2013.01); *G06F 3/065* (2013.01); *G06F 3/067* (2013.01); *G06F 3/0653* (2013.01); *G06F 3/0659* (2013.01)

(58) Field of Classification Search
    CPC ....... G06F 3/06–3/0607; G06F 3/0608–3/065; G06F 3/0652–3/0653; G06F 3/0655–3/0659; G06F 3/0661–3/067; G06F 3/0671–3/0689; G06F 2003/0691–2003/0698; G06F 11/07–11/3696; G06F 17/30–17/30997; G06F 2009/45562–2009/45595;
    (Continued)

(56) References Cited

U.S. PATENT DOCUMENTS

| 4,164,763 A | * | 8/1979 | Briccetti | ............... G11B 20/10 360/32 |
| 4,608,839 A | * | 9/1986 | Tibbals, Jr. | .............. D04B 9/12 66/13 |

(Continued)

FOREIGN PATENT DOCUMENTS

| EP | 1804157 | 7/2007 |
| WO | WO 2010/019596 | 2/2010 |

(Continued)

OTHER PUBLICATIONS

Nykamp DQ, "Directed graph definition." From Math Insight. Jul. 8, 2015; retrieved from https://mathinsight.org/definition/directed_graph on Jun. 18, 2018 (Year: 2015).*

(Continued)

*Primary Examiner* — Daniel C Chappell
(74) *Attorney, Agent, or Firm* — Daly, Crowley, Mofford & Durkee, LLP (57) ABSTRACT

Described embodiments provide methods and systems for tracking performance of a storage system including one or more system resources. One or more threads may be generated to operate the storage system. Each of the one or more threads may be associated with one of a plurality of tasks of the storage system. When an operating state of one of the one or more threads is changed, one or more performance counters of the storage system may be updated. A performance snapshot may be generated by capturing a state of the tasks associated with the threads and the performance counters.

12 Claims, 9 Drawing Sheets

(58) Field of Classification Search
CPC .................. G06F 2201/00–2201/885; G06F 2212/00–2212/7211
See application file for complete search history.

(56) References Cited

U.S. PATENT DOCUMENTS

| | | | | |
|---|---|---|---|---|
| 4,821,178 | A * | 4/1989 | Levin | G06F 11/348 714/47.2 |
| 5,319,645 | A * | 6/1994 | Bassi | G06F 11/3664 714/38.13 |
| 5,537,534 | A | 7/1996 | Voigt et al. | |
| 5,539,907 | A * | 7/1996 | Srivastava | G06F 11/3466 703/26 |
| 5,627,995 | A | 5/1997 | Miller et al. | |
| 5,710,724 | A * | 1/1998 | Burrows | G06F 11/3466 714/34 |
| 5,732,273 | A * | 3/1998 | Srivastava | G06F 11/3466 714/E11.2 |
| 5,860,137 | A | 1/1999 | Raz et al. | |
| 5,896,538 | A * | 4/1999 | Blandy | G06F 11/3409 714/E11.192 |
| 5,903,730 | A * | 5/1999 | Asai | G06F 11/323 709/223 |
| 5,940,618 | A * | 8/1999 | Blandy | G06F 11/3461 714/E11.198 |
| 5,987,250 | A * | 11/1999 | Subrahmanyam | G06F 11/3466 714/E11.2 |
| 5,999,842 | A | 12/1999 | Harrison et al. | |
| 6,226,787 | B1 * | 5/2001 | Serra | G06F 11/3664 714/E11.217 |
| 6,327,699 | B1 * | 12/2001 | Larus | G06F 11/3612 714/E11.209 |
| 6,353,805 | B1 * | 3/2002 | Zahir | G06F 9/3867 702/182 |
| 6,470,478 | B1 * | 10/2002 | Bargh | G01R 31/31704 716/102 |
| 6,519,766 | B1 * | 2/2003 | Barritz | G06F 11/3466 714/E11.2 |
| 6,643,654 | B1 | 11/2003 | Patel et al. | |
| 6,654,948 | B1 * | 11/2003 | Konuru | G06F 11/3466 714/E11.2 |
| 6,658,471 | B1 * | 12/2003 | Berry | G06F 11/3466 709/224 |
| 6,658,654 | B1 * | 12/2003 | Berry | G06F 11/3409 714/E11.192 |
| 6,870,929 | B1 | 3/2005 | Greene | |
| 6,971,092 | B1 * | 11/2005 | Chilimbi | G06F 11/3466 711/118 |
| 7,099,797 | B1 * | 8/2006 | Richard | G06F 11/261 702/182 |
| 7,143,410 | B1 | 11/2006 | Coffman et al. | |
| 7,251,663 | B1 | 7/2007 | Smith | |
| 7,315,795 | B2 * | 1/2008 | Homma | G06F 11/3409 702/182 |
| 7,389,497 | B1 * | 6/2008 | Edmark | G06F 11/3612 714/E11.207 |
| 7,421,681 | B2 * | 9/2008 | DeWitt, Jr. | G06F 9/30181 712/E9.035 |
| 7,552,125 | B1 | 6/2009 | Evans | |
| 7,574,587 | B2 * | 8/2009 | DeWitt, Jr. | G06F 9/30181 700/78 |
| 7,714,747 | B2 | 5/2010 | Fallon | |
| 7,814,218 | B1 | 10/2010 | Knee et al. | |
| 7,827,136 | B1 | 11/2010 | Wang et al. | |
| 7,908,436 | B1 | 3/2011 | Srinivasan et al. | |
| 8,200,923 | B1 | 6/2012 | Healey et al. | |
| 8,335,899 | B1 | 12/2012 | Meiri et al. | |
| 8,478,951 | B1 | 7/2013 | Healey et al. | |
| 9,037,822 | B1 | 5/2015 | Meiri et al. | |
| 9,104,326 | B2 | 8/2015 | Frank et al. | |
| 9,128,942 | B1 | 9/2015 | Pfau et al. | |
| 9,208,162 | B1 | 12/2015 | Hallak et al. | |
| 9,304,889 | B1 | 4/2016 | Chen et al. | |
| 9,330,048 | B1 | 5/2016 | Bhatnagar et al. | |
| 9,762,460 | B2 * | 9/2017 | Pawlowski | H04L 43/045 |
| 9,769,254 | B2 | 9/2017 | Gilbert et al. | |
| 9,785,468 | B2 * | 10/2017 | Mitchell | G06F 9/50 |
| 9,858,191 | B2 * | 1/2018 | Choi | G06F 12/0862 |
| 2002/0056031 | A1 | 5/2002 | Skiba et al. | |
| 2003/0023656 | A1 * | 1/2003 | Hutchison | G06F 9/524 718/100 |
| 2003/0079041 | A1 | 4/2003 | Parrella, Sr. et al. | |
| 2003/0145251 | A1 * | 7/2003 | Cantrill | G06F 11/3466 714/35 |
| 2004/0030721 | A1 | 2/2004 | Kruger et al. | |
| 2005/0039171 | A1 * | 2/2005 | Avakian | G06F 11/3495 717/127 |
| 2005/0102547 | A1 | 5/2005 | Keeton et al. | |
| 2005/0125626 | A1 | 6/2005 | Todd | |
| 2005/0144416 | A1 | 6/2005 | Lin | |
| 2005/0171937 | A1 | 8/2005 | Hughes et al. | |
| 2005/0177603 | A1 | 8/2005 | Shavit | |
| 2005/0193084 | A1 | 9/2005 | Todd et al. | |
| 2006/0031653 | A1 | 2/2006 | Todd et al. | |
| 2006/0031787 | A1 * | 2/2006 | Ananth | G05B 15/02 715/771 |
| 2006/0047776 | A1 | 3/2006 | Chieng et al. | |
| 2006/0070076 | A1 * | 3/2006 | Ma | G06F 9/524 718/104 |
| 2006/0123212 | A1 | 6/2006 | Yagawa | |
| 2006/0242442 | A1 | 10/2006 | Armstrong et al. | |
| 2007/0078982 | A1 | 4/2007 | Aidun et al. | |
| 2007/0208788 | A1 | 9/2007 | Chakravarty et al. | |
| 2007/0297434 | A1 | 12/2007 | Arndt et al. | |
| 2008/0163215 | A1 | 7/2008 | Jiang et al. | |
| 2008/0178050 | A1 | 7/2008 | Kern et al. | |
| 2008/0288739 | A1 | 11/2008 | Bamba et al. | |
| 2009/0006745 | A1 | 1/2009 | Cavallo et al. | |
| 2009/0030986 | A1 | 1/2009 | Bates | |
| 2009/0049450 | A1 | 2/2009 | Dunshea et al. | |
| 2009/0089483 | A1 | 4/2009 | Tanaka et al. | |
| 2009/0100108 | A1 | 4/2009 | Chen et al. | |
| 2009/0222596 | A1 | 9/2009 | Flynn et al. | |
| 2009/0319996 | A1 * | 12/2009 | Shafi | G06F 8/314 717/125 |
| 2010/0042790 | A1 | 2/2010 | Mondal et al. | |
| 2010/0180145 | A1 | 7/2010 | Chu | |
| 2010/0199066 | A1 | 8/2010 | Artan et al. | |
| 2010/0205330 | A1 | 8/2010 | Noborikawa et al. | |
| 2010/0223619 | A1 * | 9/2010 | Jaquet | G06F 9/5016 718/104 |
| 2010/0257149 | A1 * | 10/2010 | Cognigni | G06F 17/30575 707/698 |
| 2011/0060722 | A1 | 3/2011 | Li et al. | |
| 2011/0083026 | A1 | 4/2011 | Mikami et al. | |
| 2011/0099342 | A1 | 4/2011 | Ozdemir | |
| 2011/0119679 | A1 | 5/2011 | Muppirala et al. | |
| 2011/0161297 | A1 | 6/2011 | Parab | |
| 2011/0225122 | A1 | 9/2011 | Denuit et al. | |
| 2012/0054472 | A1 * | 3/2012 | Altman | G06F 11/3476 712/219 |
| 2012/0059799 | A1 | 3/2012 | Oliveira et al. | |
| 2012/0078852 | A1 | 3/2012 | Haselton et al. | |
| 2012/0124282 | A1 | 5/2012 | Frank et al. | |
| 2012/0278793 | A1 * | 11/2012 | Jalan | G06F 11/3419 717/158 |
| 2012/0290546 | A1 | 11/2012 | Smith et al. | |
| 2012/0290798 | A1 | 11/2012 | Huang et al. | |
| 2012/0304024 | A1 | 11/2012 | Rohleder et al. | |
| 2013/0031077 | A1 | 1/2013 | Liu et al. | |
| 2013/0073527 | A1 | 3/2013 | Bromley | |
| 2013/0111007 | A1 * | 5/2013 | Hoffmann | G06F 11/34 709/224 |
| 2013/0138607 | A1 * | 5/2013 | Bashyam | G06F 17/30174 707/610 |
| 2013/0151683 | A1 | 6/2013 | Jain et al. | |
| 2013/0151759 | A1 | 6/2013 | Shim et al. | |
| 2013/0246724 | A1 | 9/2013 | Furuya | |
| 2013/0265883 | A1 | 10/2013 | Henry et al. | |
| 2013/0282997 | A1 | 10/2013 | Suzuki et al. | |
| 2013/0332610 | A1 | 12/2013 | Beveridge | |

(56) References Cited

U.S. PATENT DOCUMENTS

| | | | |
|---|---|---|---|
| 2014/0040199 | A1 | 2/2014 | Golab et al. |
| 2014/0136759 | A1 | 5/2014 | Sprouse et al. |
| 2014/0161348 | A1 | 6/2014 | Sutherland et al. |
| 2014/0237201 | A1 | 8/2014 | Swift |
| 2014/0297588 | A1 | 10/2014 | Babashetty et al. |
| 2014/0359231 | A1 | 12/2014 | Matthews |
| 2014/0380282 | A1* | 12/2014 | Ravindranath Sivalingam ........... G06F 11/3476 717/128 |
| 2015/0006910 | A1 | 1/2015 | Shapiro |
| 2015/0088823 | A1 | 3/2015 | Chen et al. |
| 2015/0112933 | A1 | 4/2015 | Satapathy |
| 2015/0149739 | A1 | 5/2015 | Seo et al. |
| 2015/0249615 | A1 | 9/2015 | Chen et al. |
| 2015/0324236 | A1 | 11/2015 | Gopalan et al. |
| 2016/0042285 | A1 | 2/2016 | Gilenson et al. |
| 2016/0080482 | A1 | 3/2016 | Gilbert et al. |
| 2016/0188419 | A1 | 6/2016 | Dagar et al. |
| 2016/0350391 | A1 | 12/2016 | Vijayan et al. |
| 2016/0359968 | A1 | 12/2016 | Chitti et al. |
| 2016/0366206 | A1 | 12/2016 | Shemer et al. |
| 2017/0123704 | A1 | 5/2017 | Sharma et al. |
| 2017/0139786 | A1 | 5/2017 | Simon et al. |
| 2017/0161348 | A1 | 6/2017 | Araki et al. |

FOREIGN PATENT DOCUMENTS

| | | |
|---|---|---|
| WO | WO 2010/040078 | 4/2010 |
| WO | WO 2012/066528 | 5/2012 |

OTHER PUBLICATIONS

Introduction to Trees; Feb. 14, 2015; retrieved from http://pages.cs.wisc.edu/~vernon/cs367/notes/8.TREES.html on Jun. 18, 2018 (Year: 2015).*

G-FDDS: A graph-based fault diagnosis in distributed systems; Zhao et al.; 2nd IEEE International Conference on Computational Intelligence and Applications; Sep. 8-11, 2017 (Year: 2017).*

Low overhead program monitoring and profiling; Kumar et al.; Proceedings of the 6th ACM SIGPLAN-SIGSOFT workshop on Program analysis for software tools and engineering; Sep. 5-6, 2005; pp. 28-34 (Year: 2005).*

Living on the edge: rapid-toggling probes with cross-modification on x86; Chamith et al.; Proceedings of the 37th ACM SIGPLAN Conference on Programming Language Design and Implementation Jun. 13-17, 2016; pp. 16-26 (Year: 2016).*

Office Action dated Nov. 1, 2017 corresponding to U.S. Appl. No. 15/196,374, 64 Pages.

U.S. Non-Final Office Action dated Dec. 11, 2017 for U.S. Appl. No. 15/196,447; 54 Pages.

U.S. Non-Final Office Action dated Dec. 14, 2017 for U.S. Appl. No. 15/076,946; 28 Pages.

U.S. Appl. No. 14/034,981, filed Sep. 24, 2013, Halevi et al.
U.S. Appl. No. 14/037,577, filed Sep. 26, 2013, Ben-Moshe et al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15/001,784, filed Jan. 20, 2016, Meiri et al.
U.S. Appl. No. 15/001,789, filed Jan. 20, 2016, Meiri et al.
U.S. Appl. No. 15/085,168, filed Mar. 30, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,172, filed Mar. 30, 2016, Meiri.
U.S. Appl. No. 15/085,181, filed Mar. 30, 2016, Meiri et al.
U.S. Appl. No. 15/085,188, filed Mar. 30, 2016, Meiri et al.
U.S. Appl. No. 15/196,427, filed Jun. 29, 2016, Shveidel.
U.S. Appl. No. 15/196,374, filed Jun. 29, 2016, Shveidel et al.
U.S. Appl. No. 15/196,447, filed Jun. 29, 2016, Shveidel et al.
U.S. Appl. No. 15/196,472, filed Jun. 29, 2016, Shveidel.

PCT International Search Report and Written Opinion dated Dec. 1, 2011 for PCT Application No. PCT/IL2011/000692; 11 Pages.

PCT International Preliminary Report dated May 30, 2013 for PCT Patent Application No. PCT/IL2011/000692: 7 Pages.

U.S. Appl. No. 12/945,915; 200 Pages.
U.S. Appl. No. 12/945,915; 108 Pages.
U.S. Appl. No. 12/945,915; 67 Pages.

Nguyen et al., "B+ Hash Tree: Optimizing Query Execution Times for on-Disk Semantic Web Data Structures;" Proceedings of the 6th International Workshop on Scalable Semantic Web Knowledge Base Systems; Shanghai, China, Nov. 8, 2010; 16 Pages.

Notice of Allowance dated Apr. 13, 2015 corresponding to U.S. Appl. No. 14/037,511; 11 Pages.

Non-Final Office Action dated May 11, 2015 corresponding to U.S. Appl. No. 14/037,626; 13 Pages.

Response to Office Action dated May 11, 2015 corresponding to U.S. Appl. No. 14/037,626; Response filed on Jul. 20, 2015; 10 Pages.

Notice of Allowance dated Oct. 26, 2015 corresponding to U.S. Appl. No. 14/037,626; 12 Pages.

Office Action dated Jul. 22, 2015 corresponding to U.S. Appl. No. 14/034,981; 28 Pages.

Response to Office Action dated Jul. 22, 2015 corresponding to U.S. Appl. No. 14/034,981; Response filed on Dec. 22, 2015; 14 Pages.

Office Action dated Sep. 1, 2015 corresponding to U.S. Appl. No. 14/230,414; 13 Pages.

Response to Office Action dated Sep. 1, 2015 corresponding to U.S. Appl. No. 14/230,414; Response filed on Jan. 14, 2016; 10 Pages.

Restriction Requirement dated Sep. 24, 2015 corresponding to U.S. Appl. No. 14/230,405; 8 Pages.

Response to Restriction Requirement dated Sep. 24, 2015 corresponding to U.S. Appl. No. 14/230,405;Response filed Oct. 6, 2015; 1 Page.

Office Action dated Dec. 1, 2015 corresponding to U.S. Appl. No. 14/230,405; 17 Pages.

Office Action dated Feb. 4, 2016 corresponding to U.S. Appl. No. 14/037,577; 26 Pages.

Notice of Allowance dated Feb. 10, 2016 corresponding to U.S. Appl. No. 14/494,899; 19 Pages.

Notice of Allowance dated Feb. 26, 2016 corresponding to U.S. Appl. No. 14/230,414; 8 Pages.

Final Office Action dated Apr. 6, 2016 corresponding to U.S. Appl. No. 14/034,981; 38 Pages.

Response filed on May 2, 2016 to the Non-Final Office Action dated Dec. 1, 2015; for U.S. Appl. No. 14/230,405; 8 pages.

Response filed on May 2, 2016 to the Non-Final Office Action dated Feb. 4, 2016; for U.S. Appl. No. 14/037,577; 10 pages.

U.S. Non-Final Office Action dated Jan. 11, 2018 corresponding to U.S. Appl. No. 15/085,168; 14 Pages.

U.S. Non-Final Office Action dated Jan. 8, 2018 corresponding to U.S. Appl. No. 15/196,472; 16 Pages.

* cited by examiner

LOW-IMPACT APPLICATION-LEVEL PERFORMANCE MONITORING WITH MINIMAL AND AUTOMATICALLY UPGRADABLE INSTRUMENTATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect may provide a method for tracking performance of a storage system including one or more system resources. One or more threads may be generated to operate the storage system. Each of the one or more threads may be associated with one of a plurality of tasks of the storage system. When an operating state of one of the one or more threads is changed, one or more performance counters of the storage system may be updated. A performance snapshot may be generated by capturing a state of the tasks associated with the threads and the performance counters.

Another aspect may provide a system including a processor and a memory storing computer program code that when executed on the processor causes the processor to operate a storage system. The system is operable to track performance of a storage system including one or more system resources. One or more threads may be generated to operate the storage system. Each of the one or more threads may be associated with one of a plurality of tasks of the storage system. When an operating state of one of the one or more threads is changed, one or more performance counters of the storage system may be updated. A performance snapshot may be generated by capturing a state of the tasks associated with the threads and the performance counters.

Another aspect may provide a computer program product including a non-transitory computer readable storage medium having computer program code encoded thereon that when executed on a processor of a computer causes the computer to operate a storage system. The system is operable to track performance of a storage system including one or more system resources. One or more threads may be generated to operate the storage system. Each of the one or more threads may be associated with one of a plurality of tasks of the storage system. When an operating state of one of the one or more threads is changed, one or more performance counters of the storage system may be updated. A performance snapshot may be generated by capturing a state of the tasks associated with the threads and the performance counters.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
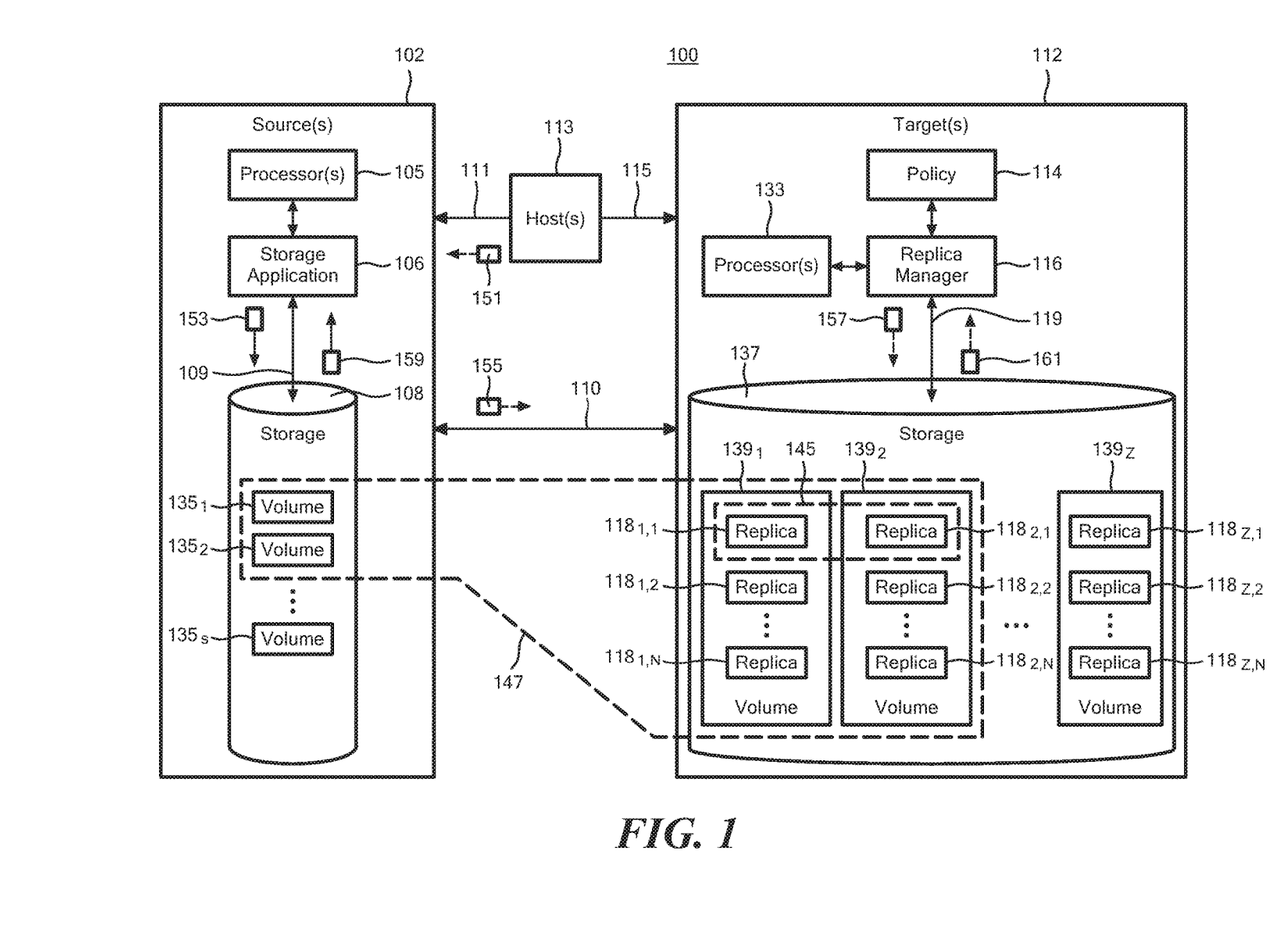
FIG. 1 is a block diagram of an example of a storage system in accordance with an illustrative embodiment.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (IB) link or Fibre Channel (FC) link. Communication link 109 may be employed to transfer data between storage volumes $135_{1-S}$ of storage 108 and one or both of storage application 106 and processor(s) 105. Communication link 119 may be employed to transfer data between storage volumes $139_{1-z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes $135_1$ and $135_2$ and two target volumes $139_1$ and $139_2$. Each of target volumes $139_1$ and $139_2$ may include one or more replicas 118. In some embodiments, replicas 118 for respective source volumes 135 of consistency group 147 may be grouped into sets (e.g., a snapshot set or snapset 145).

Figure 2:
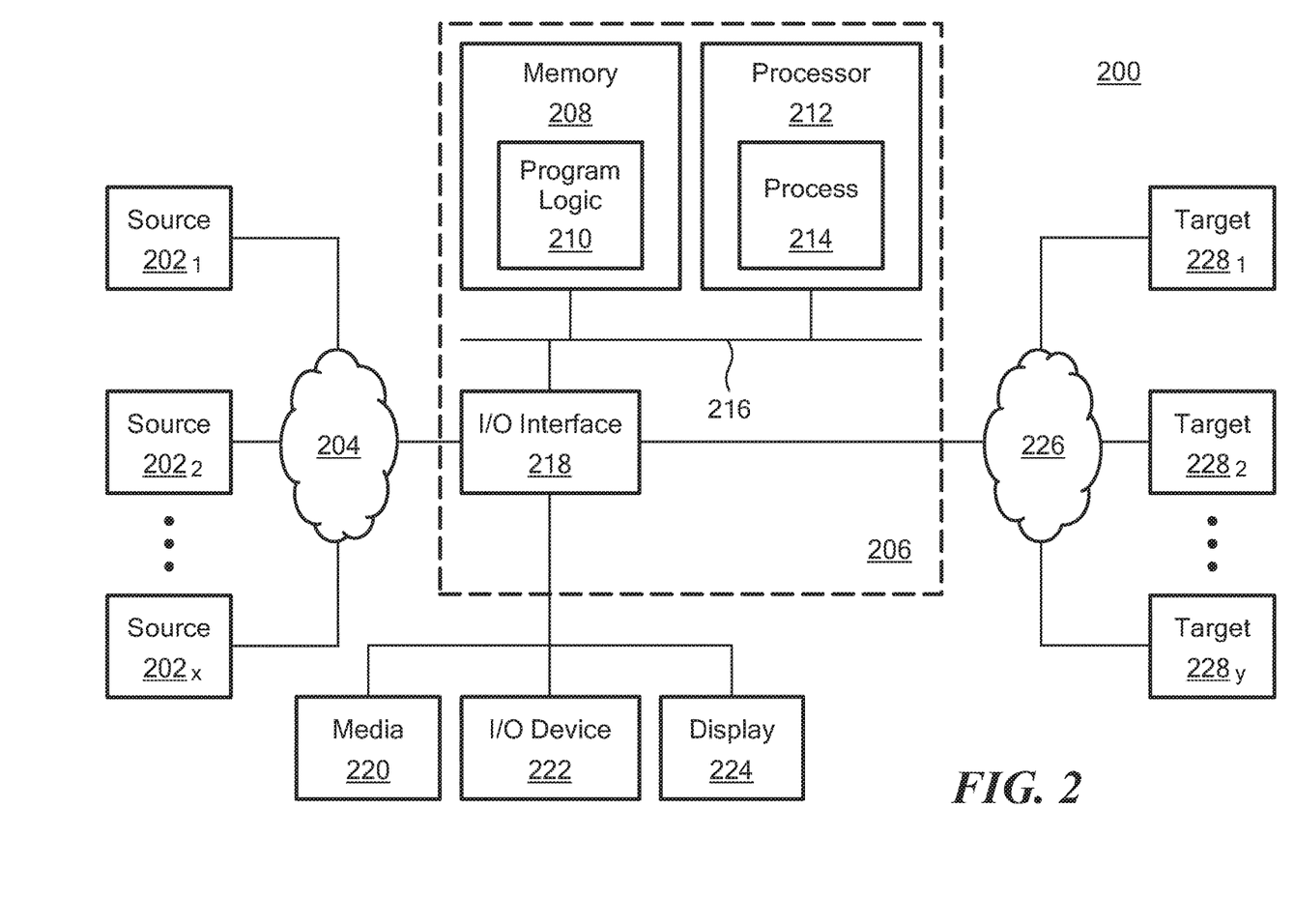
FIG. 2 is a block diagram of another example of a storage system in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Figure 3A:
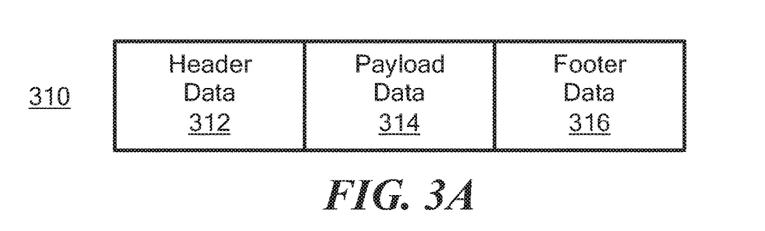
FIG. 3A is a block diagram of an example data packet of an input/output (I/O) operation of the storage system of FIG. 1 in accordance with an illustrative embodiment.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. For example, FIG. 3A shows a block diagram of an illustrative data packet 310. As shown in FIG. 3A, in some embodiments, data packet 310 may include one or more of header data 312, payload data 314 and footer data 316. Payload data 314 may be the data to be written to storage 108 or data that is read from storage 108 (e.g., user data), and header data 312 and/or footer data 316 may be data associated with I/O request 151 that may be employed by storage system 100 to process I/O request 151 (e.g., source and/or destination address information, error correction information, data and/or packet format information, metadata, and other information).

In some embodiments, payload data 314 may be segmented into one or more payload data segments to be written to storage 108 (e.g., by one or more write operations 153) or read from storage 108 (e.g., by one or more read operations 159). For example, if payload data 314 is 256 KB, payload data 314 may be segmented into sixteen 16 KB payload data segments to be written to storage 108. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Similarly to write request 151, replica 155 may include one or more data packets such as shown in FIG. 3A. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3B:
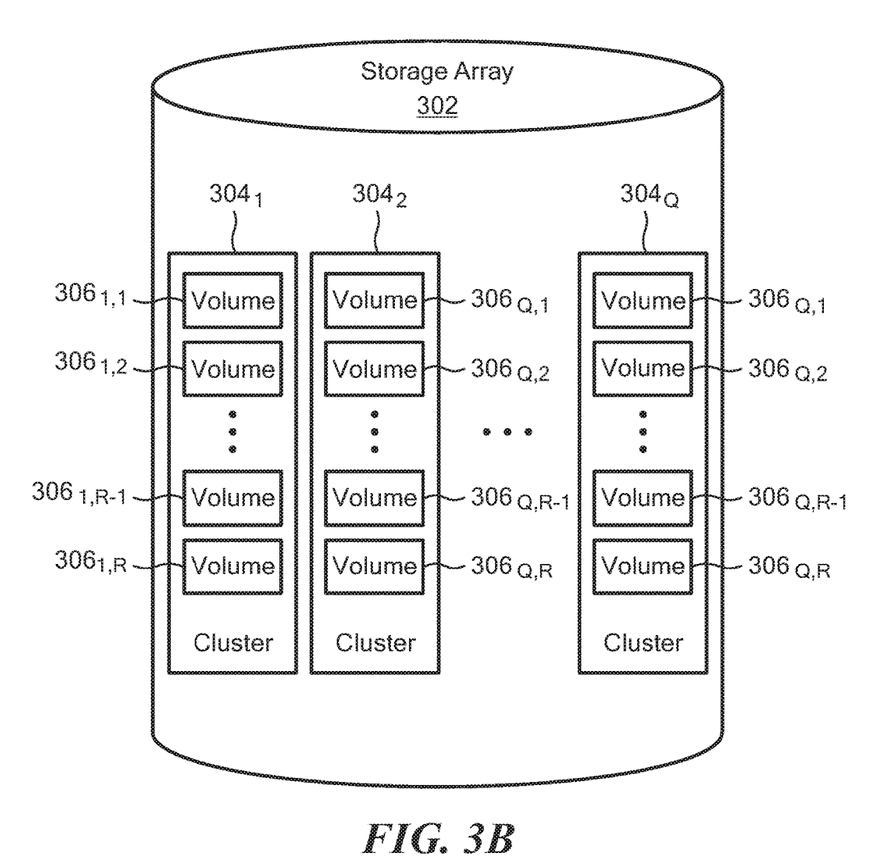
FIG. 3B is a block diagram of an example storage array of the storage system of FIG. 1 in accordance with an illustrative embodiment.

Referring to FIG. 3B, a block diagram of an illustrative storage array 302 is shown. For example, in illustrative embodiments, one or both of storage 108 and storage 137 may be implemented as storage array 302. As shown, in some embodiments, storage array 302 may include one or more clusters $304_1$-$304_Q$ (referred to generally as clusters 304) where Q may be a positive integer. In illustrative embodiments, clusters 304 may include one or more physical and/or virtual storage volumes, shown generally as storage volumes 306. For example, cluster $304_1$ may include storage volumes $306_{1,1}$-$306_{1,R}$, where R may be a positive integer. For example, clusters 304 may include one or more physical storage volumes such as hard disk drives (HDDs), solid state drives (SSDs) such as flash drives, a hybrid magnetic and solid state drive, etc., and/or one or more virtual storage volumes, such as a cloud storage, or a combination of physical storage volumes and virtual storage volumes.

Described embodiments provide performance analysis of storage system 100. Some embodiments may employ one or more performance counters associated with resources of storage system 100 (e.g., CPU resources, operating system resources, etc.), and one or more application-specific or task-specific performance counters associated with individual applications, services or tasks of storage system 100. Described embodiments provide a manner for identifying relationships between the various performance counters and the application flow without requiring manual instrumentation upgrades with each new version of operating system (OS) software for storage system 100.

Figure 3C:
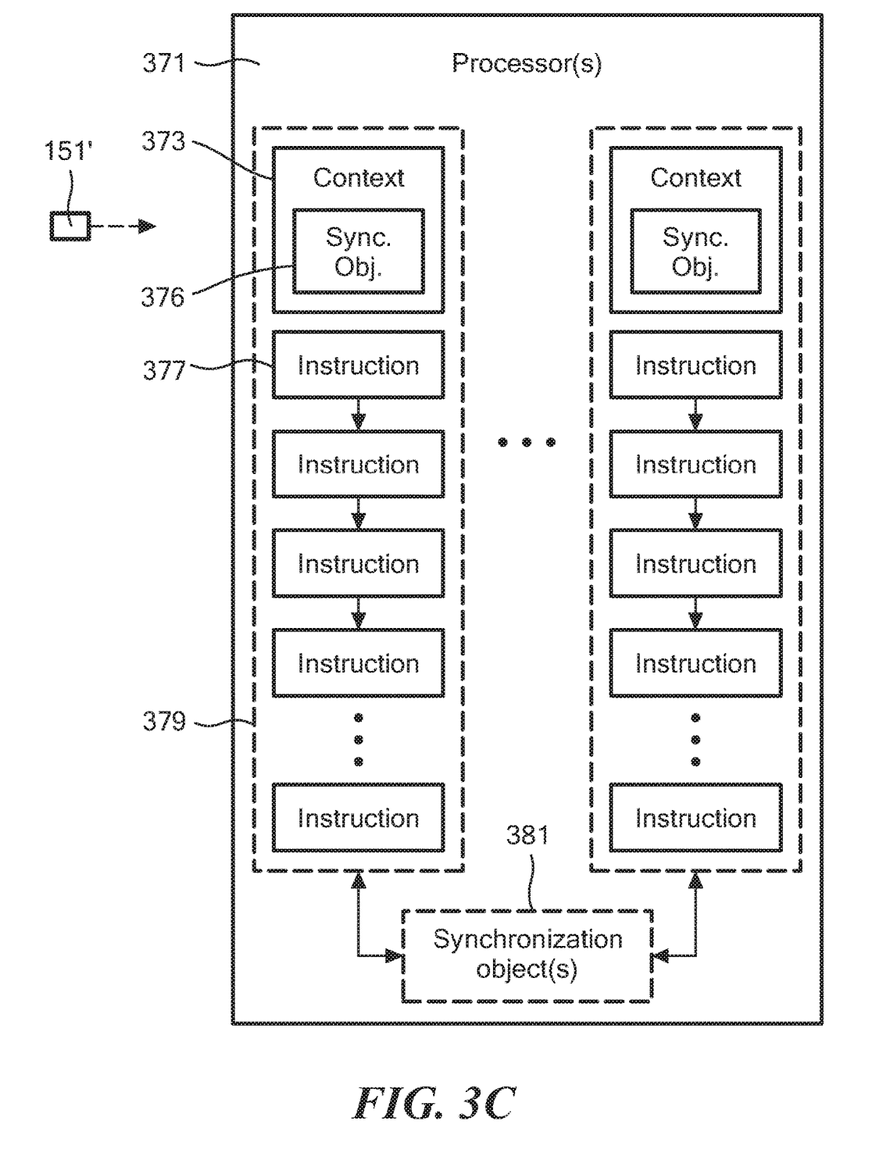
FIG. 3C is a block diagram showing example threads of the storage system of FIG. 1 in accordance with an illustrative embodiment.

Described embodiments may employ one or more threads to perform operations of storage system 100 (e.g., operations associated with I/O request 151). For example, as shown in FIG. 3C, processors 371 (e.g., one or more or processors 105 and/or processors 133) may employ one or more threads 379. Each thread 379 may be a thread of one or more instructions 377 that are performed by storage system 100. Each thread 379 may also include context 373. Context 373 may include one or more synchronization objects 376. In some embodiments, threads 379 may optionally be in communication with one or more external synchronization objects 381. For example, synchronization objects 376 and/or 381 may include a lock, a semaphore, or an event, by which threads may communicate with one another.

Illustrative embodiments may monitor performance of threads (e.g., 379) that are grouped by the application-level task the threads perform. For example, some embodiments may group threads based on the thread's entry function and/or an additional operation code.

Some embodiments may monitor performance of tasks using directed-graphs (diagrams). The performance data may be collected in one or more points-of-interest into performance data containers. Performance data containers may be presented as nodes and edges of the directed-graph related to a specific task. For example, a performance data container may be represented as a node of a directed-graph for a specific task. An example of a performance data container that may be represented as a node is an OS synchronization object (e.g., synchronization objects 376 and/or 381 of FIG. 3C). Sequences of processor instructions (e.g., instructions 377 of FIG. 3C) between two nodes may be represented as edges of a directed-graph for a specific task. Since each node represents a system resource, data structure or a stage of processing for a given task, the directed-graph provides a visual representation of processing flows for a given task.

Figure 6:
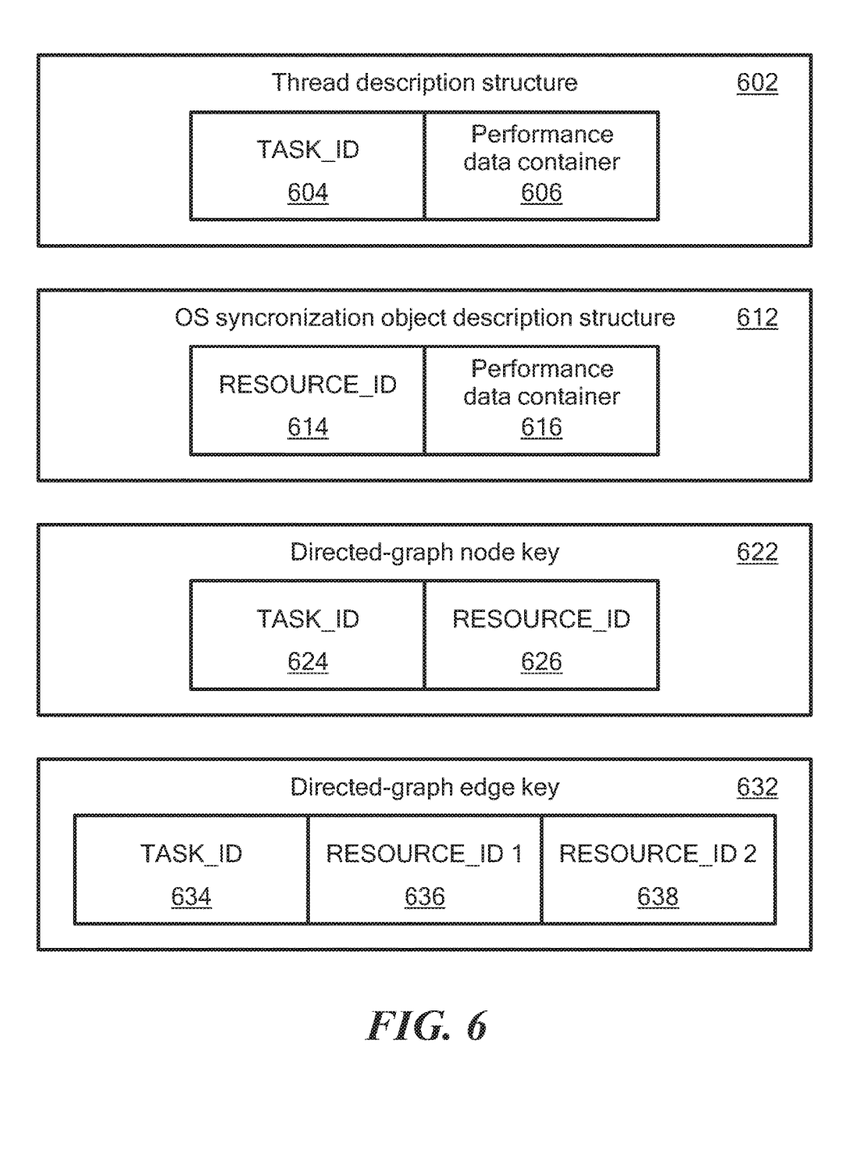
FIG. 6 is a block diagram of illustrative data structures of a performance snapshot in accordance with an illustrative embodiment.

Referring to FIG. 6, illustrative data structures employed to track the performance of storage system 100 are shown. As shown, thread description structure 602 may include an associated TASK_ID 604 and an associated performance data container 606. OS synchronization object description structure 612 may include an associated RESOURCE_ID 614 and an associated performance data container 616. Directed-graph node key 622 may include an associated TASK_ID 624 and an associated RESOURCE_ID 626, and directed-graph edge key 632 may include an associated TASK_ID 634, an associated first RESOURCE_ID 636, and an associated second RESOURCE_ID 638 that define the sequence of instructions between two resource nodes of the directed-graph.

Figure 7:
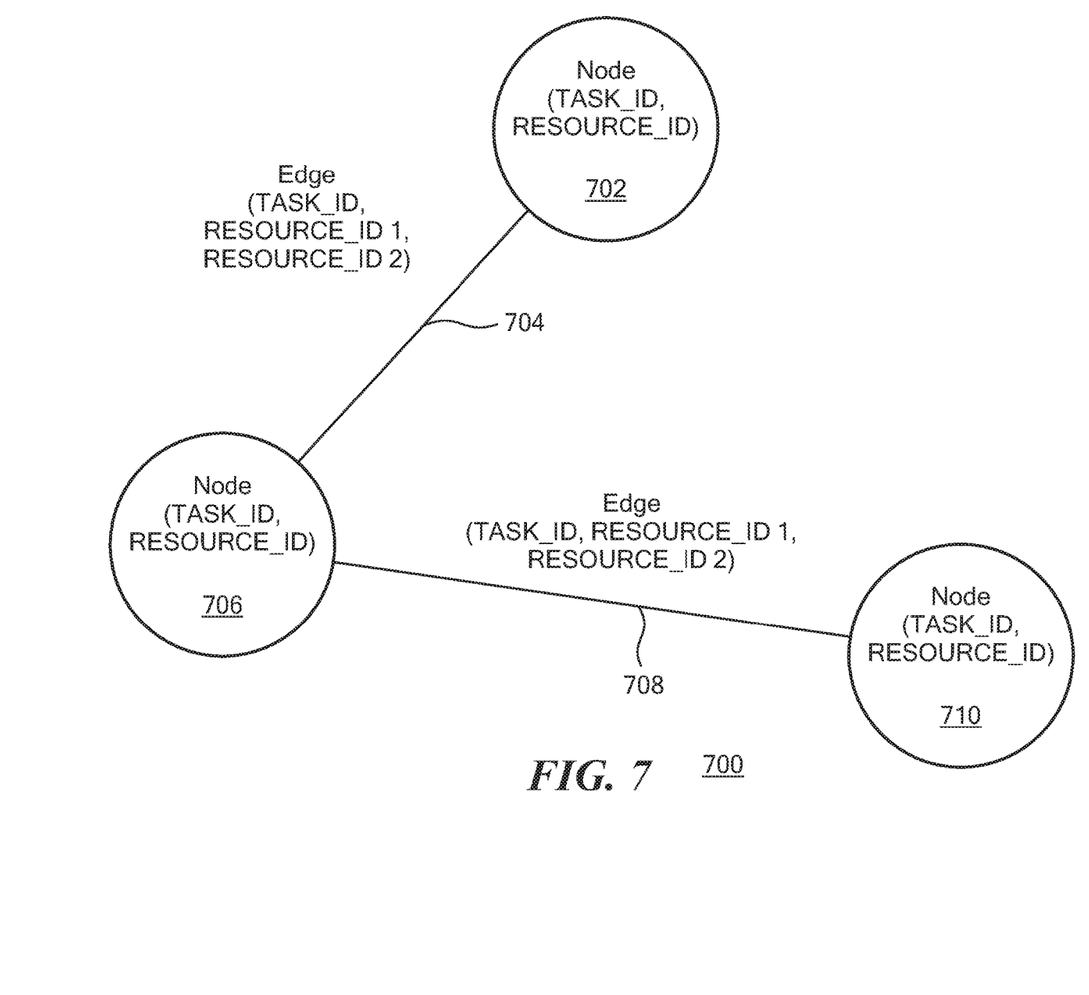
FIG. 7 is an illustrative task-specific directed-graph showing performance of the storage system in accordance with an illustrative embodiment.

Referring to FIG. 7, an illustrative directed-graph 700 is shown. As shown in FIG. 7, directed-graph 700 may include one or mode nodes, for example shown as nodes 702, 706, and 710. Each of nodes 702, 706, and 710 may have an associated key (e.g., 622 of FIG. 6) that is based upon a TASK_ID and RESOURCE_ID associated with the given node. As shown, two nodes may be joined by an associated edge, such as edges 704 and 708. Each of edges 704 and 708 may have an associated key (e.g., 632 of FIG. 6) that is based upon a TASK_ID, a first RESOURCE_ID, and a second RESOURCE_ID associated with the given node.

In described embodiments, threads may be in one of three main operating states: RUNNING, READY, or SUSPENDED. The RUNNING operating state indicates that the thread is presently running, while the READY operating state indicates that the thread is ready to be performed, but is waiting for processor resources to be available, and the SUSPENDED operating state indicates that the thread is stopped (e.g., suspended) at a synchronization object. Described embodiments may update the one or more performance counters when a thread transitions between operating states.

Described embodiments may collect application level performance data without much instrumentation (e.g., low-impact) by employing the performance counters. For example, performance counters may be updated upon operating state transitions of given threads, such that updating the performance counters may not require much system resources or complex tracking mechanisms. Further, described embodiments may provide for performance tracking functionality that may be upgradable with versions of software operating on storage system 100. For example, the one or more performance counters may be implemented in a thread scheduler operating in storage system 100 (e.g., in one of processors). Upgrades to the performance counters may be accomplished by upgrading the thread scheduler, which is a stable and basic component, such that performance tracking instrumentation is automatically upgraded when the system software is upgraded.

The one or more performance counters collected for each performance data container may vary based upon a setup of storage system 100. Some embodiments may employ performance counters to collect data for each directed-graph node, and the performance counters may include counters for accumulating a number of accesses, accumulating a number of requested units (for cases when a single access contains a batch of requested units (e.g., data blocks)), accumulating suspended time, determining an average number of suspended requests, and other data. Some embodiments may employ additional performance counters to collect data for each directed-graph edge, and the performance counters may include counters for accumulating a number of passes (e.g., a number of times a given sequence of instructions have been performed), accumulating a run time (e.g., a time in the RUNNING state), accumulating a time in the READY state, accumulating a number of cooperative yields (e.g., a number of times one thread has yielded a resource to another thread), and other data.

Described embodiments may track performance of storage system 100 by periodically generating a snapshot of the performance counters. In some embodiments, a snapshot mechanism may be implemented by an independent OS process (e.g., a process operating concurrently with other OS processes of storage system 100). For example, in an illustrative embodiment, the snapshot mechanism may operate as described in U.S. Pat. No. 9,141,290, filed May 13, 2012, entitled "Snapshot Mechanism," assigned to EMC Corporation, the teachings of which are incorporated by reference herein in their entirety. The snapshot process may utilize processor and storage resources that are not associated with high-performance flows. In other words, the snapshot process may be performed as a background and/or low-priority process of storage system 100. A snapshot interval (e.g., how frequently the snapshot process is performed) may be a tradeoff between the time-precision of the performance tracking and the system resources consumed by generating snapshots. In some embodiments, the snapshot interval may be a value set by a user of storage system 100. In some embodiments, the snapshot interval may be dynamically adjusted by storage system 100 based upon one or more operating conditions of the storage system (e.g., availability of processor 105 and/or 133, available space of storage 108 and/or 137, etc.).

Performance data containers may be identified by unique keys. In described embodiments, the keys may be based upon a globally (e.g., within storage system 100) unique task identifier (TASK_ID) associated with the task, and a globally unique resource identifier (RESOURCE_ID) associated with a resource associated with the task. For example, a thread description structure associated with each unique thread may include a field indicating the TASK_ID associated with the given thread. Similarly, each OS synchronization object (e.g., synchronization objects 376 and/or 381 of FIG. 3C) may have an associated description structure that may include a field indicating the RESOURCE_ID of the given synchronization object.

The keys for the directed-graph nodes may be two-tuples based upon the corresponding TASK_ID and RESOURCE_ID, and the keys for the directed-graph edges (e.g., sequences of processor instructions between two nodes) may be three-tuples based upon the TASK_ID and the RESOURCE IDs for each of the two nodes that define the given edge.

Referring back to FIG. 4, a flow diagram of an illustrative process for operating storage system 100 of FIG. 1 is shown as process 400. At block 402, process 400 starts, for example when storage system 100 is powered on. At block 404, storage system 100 initializes one or more resource-specific performance counters and one or more application-specific performance counters to track performance of storage system 100. At block 406, storage system 100 generates one or more threads to operate the storage system. At block 408, storage system 100 monitors a state of each thread (e.g., RUNNING, READY, or SUSPENDED). At block 410, if the state of a given thread has changed, then at block 412, the performance counters of storage system 100 may be updated.

Figure 4:
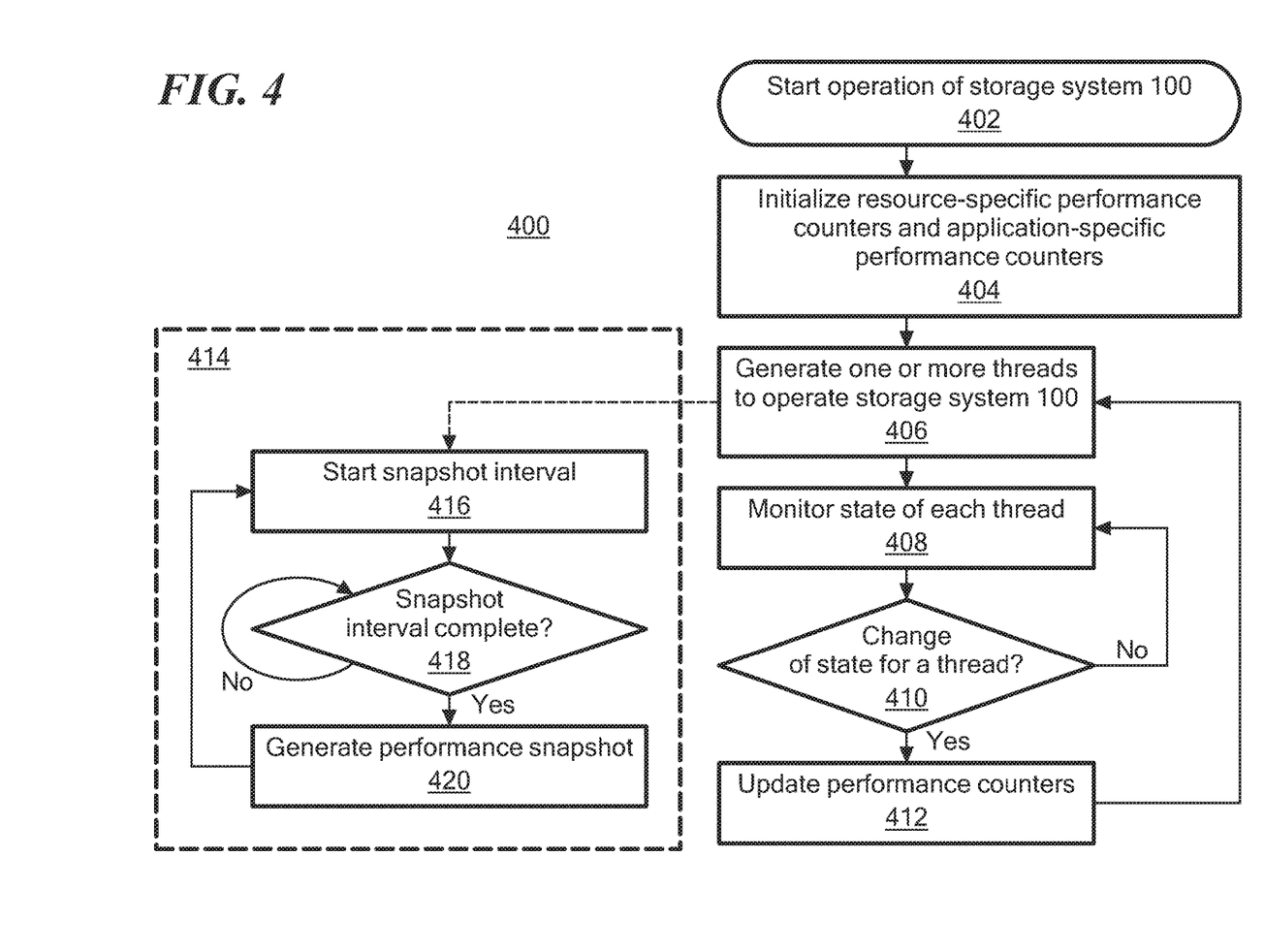
FIG. 4 is a flow diagram of an example of a process to operate the storage system of FIG. 1 in accordance with an illustrative embodiment.

Process 400 returns to block 406 as threads are created and processed to operate storage system 100. If, at block 410, the state of a given thread has not changed, then process 400 returns to block 408.

As indicated by the dashed line, snapshot process 414 may be performed concurrently with (e.g., in parallel with) blocks 406, 408, 410, and 412 of process 400. At block 416, a snapshot interval may be started for generating a snapshot of the performance counter data. If, at block 418, the snapshot interval is complete, then at block 420, a snapshot of the performance counter data may be generated. Block 420 is described in greater detail in regard to FIG. 5. Snapshot process 414 returns to block 416 to begin a subsequent snapshot interval. Processes 400 and 414 may continue to operate until storage system 100 is powered off.

Figure 5:
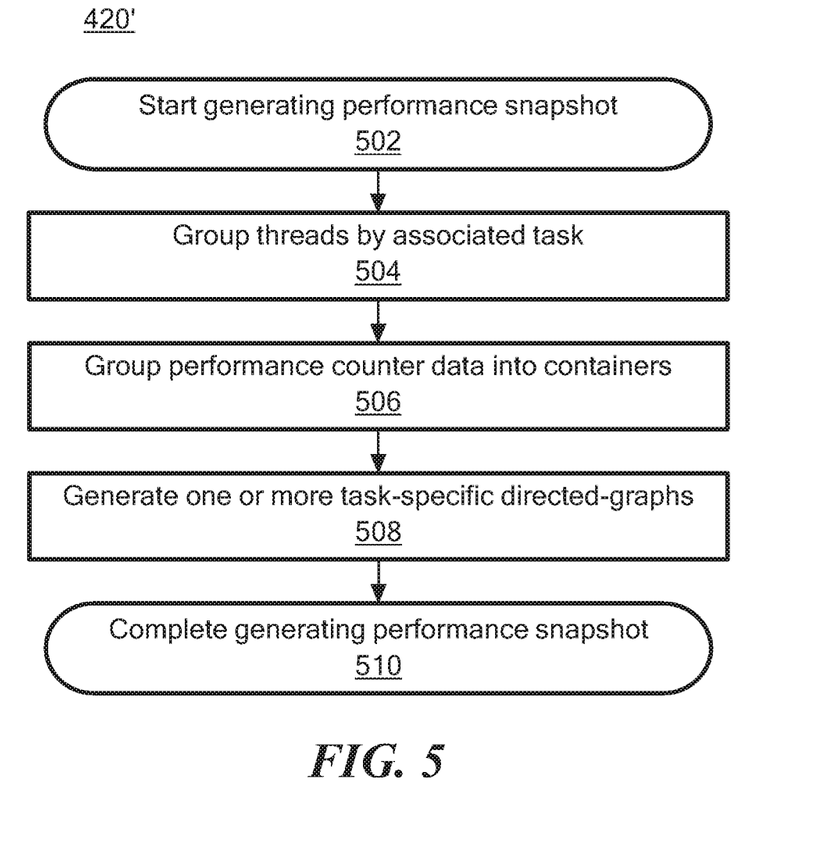
FIG. 5 is a flow diagram of an example of a process to generate a performance snapshot in accordance with an illustrative embodiment.

FIG. 5 shows additional detail of block 420 of FIG. 4 for generating a snapshot of the performance counter data, shown as process 420'. As shown in FIG. 5, process 420' may start at block 502. At block 504, storage system 100 may group one or more threads by a task associated with each thread. At block 506, performance counter data is grouped into one or more related performance data containers. For example, as described herein, a performance data container may be associated with an OS synchronization object. At block 508, one or more task-specific directed-graphs may be generated and provided to a user of storage system 100. At block 510, process 420' completes.

Figure 8:
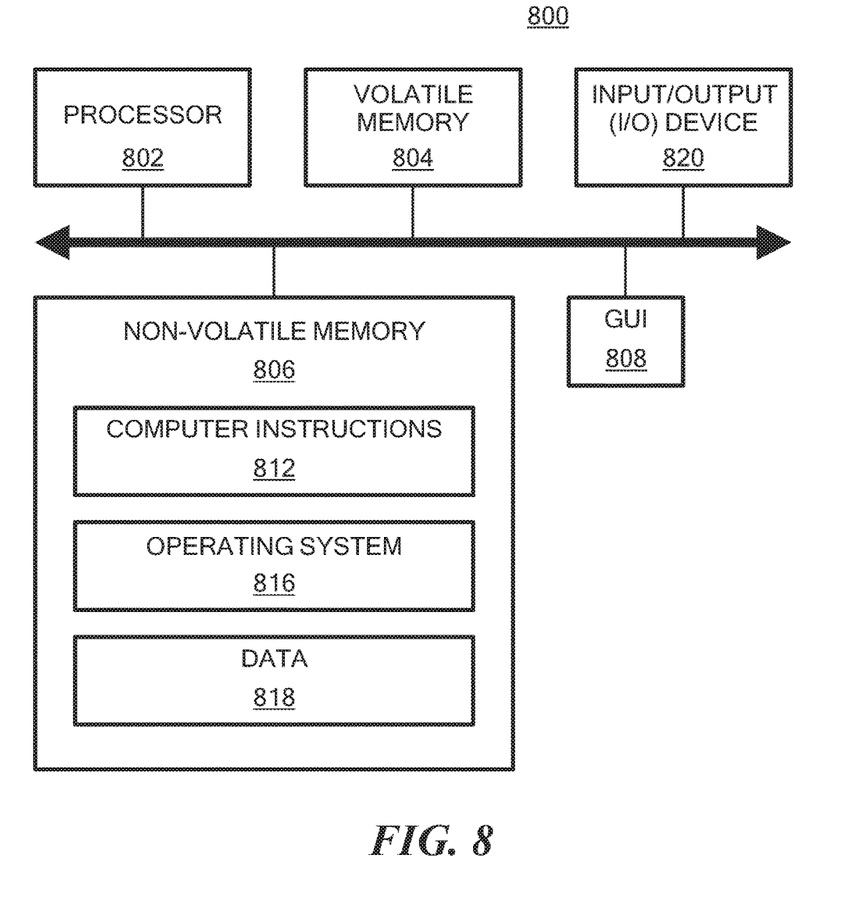
FIG. 8 is a block diagram of an example of a hardware device that may perform at least a portion of the processes in FIGS. 4 and 5.

Referring to FIG. 8, in some embodiments, source site 102 and/or target site 112 may be implemented as one or more computers. Computer 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of processes 400 and 420' (FIGS. 4 and 5). Program code may be applied to data entered using an input device of GUI 808 or received from I/O device 820.

Processes 400 and 420' (FIGS. 4 and 5) are not limited to use with the hardware and software of FIG. 8 and may find applicability in any computing or processing environment and with any type of machine or set of machines that may be capable of running a computer program. Processes 400 and 420' (FIGS. 4 and 5) may be implemented in hardware, software, or a combination of the two.

The processes described herein are not limited to the specific embodiments described. For example, processes 400 and 420' are not limited to the specific processing order shown in FIGS. 4 and 5. Rather, any of the blocks of processes 400 and 420' may be re-ordered, combined or removed, performed in parallel or in serial, as necessary, to achieve the results set forth herein.

Processor 802 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   generating one or more threads to operate a storage system, the storage system comprising one or more system resources, and each of the one or more threads associated with one of a plurality of tasks of the storage system;
   updating one or more performance counters of the storage system in response to a change in operating state of one of the one or more threads; and
   generating a performance snapshot by capturing a state of the tasks associated with the threads and the performance counters wherein generating the performance snapshot comprises: grouping one or more of the threads that are associated with a given task; grouping counter values of the one or more performance counters into containers associated with the given task; and generating a performance snapshot based upon the grouped one or more threads that are associated with the given task, and the containers associated with the given task,
   wherein generating the performance snapshot further comprises generating a directed-graph associated with the given task, the directed-graph comprising a plurality of nodes and at least one edge joining associated ones of the nodes,
   wherein each of the nodes is associated with a synchronization object of an operating system of the storage system,
   wherein each of the nodes is identified by a two-tuple node key based upon a task identifier associated with the node, and a resource identifier associated with the node, and
   wherein each of the edges is associated with a respective sequence of instructions.

2. The method of claim 1 wherein the one or more threads to operate a storage system comprises more than one thread associated with one of the plurality of tasks.

3. The method of claim 1, further comprising identifying each edge by a three-tuple edge key based upon a task identifier associated with the edge, a first resource identifier associated with a first node associated with the edge, and a second resource identifier associated with a second node associated with the edge.

4. The method of claim 1, wherein the operating state comprises one of running, ready and suspended.

5. The method of claim 1, further comprising:
   collecting, by one or more performance counters, application-level performance data with low-impact instrumentation, and
   updating firmware associated with the one or more performance counters by updating software associated with the storage system.

6. The method of claim 1, further comprising associating the one or more performance counters with the given task, the one or more performance counters comprising one or more of: a counter for accumulating a number of accesses of an associated resource by the given task, a counter for accumulating a number of requested units from the associated resource by the given task, a counter for accumulating a time of the given task in a suspended state, a counter for determining a number of suspended requests to the associated resource by the given task, and performance counters associated with sequences of processing instructions comprising one or more of: a counter for accumulating a number of passes of the given task, a counter for accumulating a time of one or more operating states of the given task, and a counter for accumulating a number of cooperative yields of the given task.

7. The method of claim 1, wherein generating a performance snapshot further comprises generating the performance snapshot at a periodic snapshot interval while concurrently operating the storage system, wherein the snapshot interval is based upon a target time-precision of the performance snapshot and available resources of the storage system.

8. A system comprising:
   a processor; and
   memory storing computer program code that when executed on the processor causes the processor to operate a storage system, the storage system operable to perform the operations of:
   generating one or more threads to operate a storage system, the storage system comprising one or more system resources, and each of the one or more threads associated with one of a plurality of tasks of the storage system;
   updating one or more performance counters of the storage system in response to a change in operating state of one of the one or more threads; and
   generating a performance snapshot by capturing a state of the tasks associated with the threads and the performance counters, wherein generating the performance snapshot comprises: grouping one or more of the threads that are associated with a given task; grouping counter values of the one or more performance counters into containers associated with the given task; and generating a performance snapshot based upon the grouped one or more threads that are associated with the given task and the containers associated with the given task, wherein generating the performance snapshot further comprises generating a directed-graph associated with the given task, the directed-graph comprising a plurality of nodes and at least one edge joining associated ones of the nodes, wherein each of the nodes is associated with a synchronization object of an operating system of the storage system, wherein each of the nodes is identified by a two-tuple node key based upon a task identifier associated with the node, and a resource identifier associated with the node, and wherein each of the edges is associated with a respective sequence of instructions.

9. The system of claim 8, wherein the storage system is further operable to perform the operations of:

collecting, by one or more performance counters, application-level performance data with low-impact instrumentation, and updating firmware associated with the one or more performance counters by updating software associated with the storage system.

10. The system of claim 8, wherein the storage system is further operable to perform the operations of:

associating the one or more performance counters with the given task, the one or more performance counters comprising one or more of: a counter for accumulating a number of accesses of an associated resource by the given task, a counter for accumulating a number of requested units from the associated resource by the given task, a counter for accumulating a time of the given task in a suspended state, a counter for determining a number of suspended requests to the associated resource by the given task, and performance counters associated with sequences of processing instructions comprising one or more of: a counter for accumulating a number of passes of the given task, a counter for accumulating a time of one or more operating states of the given task, and a counter for accumulating a number of cooperative yields of the given task; and generating the performance snapshot at a periodic snapshot interval while concurrently operating the storage system, wherein the snapshot interval is based upon a target time-precision of the performance snapshot and available resources of the storage system.

11. A computer program product including a non-transitory computer readable storage medium having computer program code encoded thereon that when executed on a processor of a computer causes the computer to operate a storage system, the computer program product comprising:

computer program code for generating one or more threads to operate a storage system, the storage system comprising one or more system resources, and each of the one or more threads associated with one of a plurality of tasks of the storage system;

computer program code for updating one or more performance counters of the storage system in response to a change in operating state of one of the one or more threads; and computer program code for generating a performance snapshot by capturing a state of the tasks associated with the threads and the performance counters, wherein generating the performance snapshot comprises: grouping one or more of the threads that are associated with a given task; grouping counter values of the one or more performance counters into containers associated with the given task; and generating a performance snapshot for each task based upon the grouped one or more threads and the containers associated with the given task, wherein generating a performance snapshot further comprises generating a directed-graph associated with the given task, the directed-graph comprising a plurality of nodes and at least one edge joining associated ones of the nodes, wherein each of the nodes is associated with a synchronization object of an operating system of the storage system, wherein each of the nodes is identified by a two-tuple node key based upon a task identifier associated with the node, and a resource identifier associated with the node, and wherein each of the edges is associated with a respective sequence of instructions.

12. The computer program product of claim 11, wherein the one or more performance counters are operable to collect application-level performance data with low-impact instrumentation, and wherein firmware associated with the one or more performance counters is updated with updates to software associated with the storage system, and wherein the computer program code for generating a performance snapshot further comprises computer program code for generating the performance snapshot at a periodic snapshot interval while concurrently operating the storage system, wherein the snapshot interval is based upon a target time-precision of the performance snapshot and available resources of the storage system.

* * * * *